United States Patent [19]

Allen et al.

[11] Patent Number: 5,675,802

[45] Date of Patent: Oct. 7, 1997

[54] VERSION CONTROL SYSTEM FOR GEOGRAPHICALLY DISTRIBUTED SOFTWARE DEVELOPMENT

[75] Inventors: Larry W. Allen, Cambridge; Gary L. Fernandez, Concord; Kenneth P. Kane, Acton; David B. Leblang, Wayland; Debra A. Minard, Newton; Gordon D. McLean, Jr., Brookline, all of Mass.

[73] Assignee: Pure Atria Corporation, Lexington, Mass.

[21] Appl. No.: 414,575

[22] Filed: Mar. 31, 1995

[51] Int. Cl.$^6$ ................................................ G06F 17/30
[52] U.S. Cl. ........................... 395/703; 395/619; 395/620
[58] Field of Search .................................. 395/600, 608, 395/617, 619, 703, 712

[56] References Cited

U.S. PATENT DOCUMENTS

| | | | |
|---|---|---|---|
| 4,558,413 | 12/1985 | Schmidt et al. | 364/300 |
| 4,809,170 | 2/1989 | Leblang et al. | 364/200 |
| 4,912,637 | 3/1990 | Sheedy et al. | 364/300 |
| 5,005,119 | 4/1991 | Rumbaugh et al. | 364/200 |
| 5,119,493 | 6/1992 | Janis et al. | 395/650 |
| 5,278,979 | 1/1994 | Foster et al. | 395/600 |
| 5,339,435 | 8/1994 | Lubkin et al. | 395/700 |
| 5,386,558 | 1/1995 | Maudlin et al. | 395/600 |

OTHER PUBLICATIONS

Mercilliott et al.; "Lotus Notes: Some Insights Into Replication" (Nov. 1991) pp. 98–100.

Walker et al.; "The LOCUS Distributed Operating System" (1983) pp. 49–69.

Birrell et al.; "Grapevine: An Exercise in Distributed Computing" (1982) pp. 260–274.

David K. Gifford; "Weighted Voting for Replicated Data" (1979) pp. 150–162.

Howard et al.; "Scale and Performance in a Distributed File System" (Feb. 1988) pp. 51–81.

Ladin et al.; "Providing High Availability Using Lazy Replication" (Nov. 1992) pp. 360–391.

Birman et al.; "Lightweight Causal and Atomic Group Multicast" (Aug. 1991) pp. 272–314.

Strom et al.; "Optimistic Recovery in Distributed Systems" (Aug. 1985) pp. 204–226.

Ernest J.H. Chang; "Echo Algorithms: Depth Parallel Operations on General Graphs" (1982) pp. 391–400.

Hendricks; "A Filesystem for Software Development", USENIX Summer Conference pp. 333–340 (1990).

Davis; "Software Checking with the Auditor's Aid"; IEEE pp. 298–303 (1990).

Beech et al.; "Generalized Version Control in an Object-Oriented Database"; IEEE pp. 14–22 (1988).

Chou et al.; "Versions and Change Notification in an Object-Oriented Database System"; IEEE pp. 275–281 (1988).

Hardwick et al.; "Using a Relational Database as an Index to a Distributed Object Database in Engineering Design Systems" IEEE pp. 4–11 (1989).

Hsieh; "Generic Computer Aided Software Engineering (CASE) Databases Requirements" IEEE pp. 422–423 (1989).

*Primary Examiner*—Thomas G. Black
*Assistant Examiner*—Donald Min
*Attorney, Agent, or Firm*—Testa, Hurwitz & Thibeault, LLP

[57] ABSTRACT

A data processing system and method for controlling files at a local development site within a geographically distributed multisite software development project includes a storage device, a processor, a mastership enforcer and an exchanger. The storage device stores a local replica including a plurality of files. Each file comprises a plurality of branches, and each branch comprises a plurality of versions of the file. The processor executes instructions, and retrieves and stores versions of the files in the storage device. The mastership enforcer provides the processor with the exclusive capability to modify specific branches by adding new versions of target files as determined by multisite mastership rules. The processor can create new versions of the target files, which are stored in the local replica within the storage device. The exchanger periodically updates the local replica by exporting the new versions of the target files to remote replicas at geographically remote development sites and importing additional new versions of the files from remote replicas. Thus, different branches of files, which are stored in multiple replicas geographically distributed at various development sites, can be modified concurrently and the replicas are updated with each others modifications periodically, without losing modifications or allowing inconsistent modifications among the replicas.

24 Claims, 8 Drawing Sheets

VERSION CONTROL SYSTEM FOR GEOGRAPHICALLY DISTRIBUTED SOFTWARE DEVELOPMENT

BACKGROUND

For many years, there was little in the way of automated configuration management in relation to computer software development. As early software systems were developed, documentation and control of the "current version" was most often accomplished as a de-facto manual configuration management. More recently, Computer-Aided Software Engineering (CASE) systems have become helpful for complex software development projects. These systems have provided an improvement in the ability to keep track of various configurations (or versions) of software systems as they are built and modified.

The size and complexity of software projects has increased dramatically in recent years. Presently, it is common to find a single software project having many million lines of code and under development by several hundred software engineers. Large software projects can require several independent lines of development to be active simultaneously. The process of creating and maintaining multiple variants of a software system is termed parallel development. One particular aspect of the development may be a major effort, such as porting an application to a new platform. Another aspect may be a minor effort, such as fixing a bug or creating a special release for an important customer. Sufficient CASE system support for parallel development is an important requirement for any configuration management system targeted at large development projects.

In a large software development organization, developers are typically located at several geographically distributed sites. Each site develops one or more subcomponents of a large software system. Sites may be situated near one another and connected by a highspeed network, or they may be distributed across multiple continents and have poor network connectivity or no network connectivity. Sites may have private databases, but may also need to share databases, libraries, and other files with other sites.

Parallel development is more difficult in a geographically distributed environment. Time zone differences, language barriers, network access and other problems complicate communication and coordination among team members. Also, the term "parallel development" does not always refer to only two development paths. In large organizations, development may be occurring at three, four, five, or more sites simultaneously. Coordinating software development changes becomes more complex as the number of sites increases.

To perform distributed development, organizations typically take a snapshot of the master source files (i.e. the basic or first versions of the programs) at a "master" site and transport them to other geographically remote sites. If changes are made at a remote site, the changed versions must be carefully merged back into the master source files at the master site. The process is largely manual and error prone, especially if several sites are making changes to the same source files. With different sites being responsible for different development tasks on particular source files, it may be difficult to know the most current version of the master copy of the source files.

Various approaches for coordinating geographically distributed software development are known. One straightforward approach involves providing users at all sites with access to a centralized, shared repository (including databases and version data storage) across a wide-area network. This approach has significant usability problems, however, including (i) vulnerability to network problems due to the need to access the central repository frequently, (ii) unacceptable performance speed due to frequent accesses to the central repository over a relatively low bandwidth wide-area network, and (iii) scaling problems for systems having large numbers of users requiring remote access to a central repository, since the load on the central server increases with the number of users in the network.

Some of the problems associated with a centralized, shared repository may be alleviated by caching information locally at each development site, perhaps by making use of an existing caching network file system. Unfortunately, this approach does not go far enough in addressing the problems of sophisticated configuration management system. For example, a caching file system may allow a development site's file data to be cached locally, but it cannot help with other (non-file) forms of data.

An alternative approach to distributed software development involves replication of the entire repository at each local site. Replication, however, carries with it the possibility that each site may change its replica (i.e., replicated repository) independently, creating the potential for conflicting changes and subsequent inconsistency of replicas.

One method for preventing conflicting changes at multiple sites is referred to as serially consistent replication. This method updates replicated data at multiple sites, keeps all the replicas continuously synchronized and avoids the possibility of lost or conflicting changes. The serial consistency constraint, however, imposes a significant penalty on the availability of data in each replica. For example, some systems require that at least a majority of all replicas be accessible when either reading or writing data at any replica. As such, the load on each replica in these systems is proportional to the number of users (because each user must contact at least half of the replicas for each read or write operation), and the aggregate network load increases as the square of the number of users. Other systems allow only one replica to modifying data at a time (e.g., token passing systems). Thus, the serially consistent replication method has highly undesirable scaling characteristics.

The serially consistent constraint can be relaxed to create weakly consistent replication. Such methods allow the contents of individual replicas to temporarily diverge with no guarantee that a change made at one replica is immediately visible at the other replicas. The presumption is that eventually, such as on a periodic basis, the replicas will be resynchronized. A number of approaches have been taken to address the problem of resolving inconsistencies that may be detected during resynchronization, but none are directly applicable to distributed software development.

One approach involving weakly consistent replication requires manual intervention upon detecting that conflicting changes have been made to a particular file. This approach may be adequate in a system with a small number of replicas and infrequent modification to files at multiple sites. However, it is generally not suited for a complex software repository which is modified continuously at all active development sites. Another approach involving weakly consistent replication assigns a modification time to each modification made to a file, and modification times are totally ordered. When two potentially conflicting changes to the same file are detected, the most recent change (i.e., the change with a later modification time) is retained. This rule ensures that all replicas will eventually reach the same state, but allows some changes to be lost.

It is therefore a principle object of the invention to provide a data processing system and method for controlling files at a local site within a geographically-distributed, multisite software development project including remote sites that allows a local data repository to be modified concurrently with remote data repositories and periodically updated without losing modifications or developing inconsistent modifications.

SUMMARY OF THE INVENTION

The present invention features a CASE version control system and method for supporting geographically-distributed software development at multiple sites by providing weakly-consistent replicas (which include versioned object data stored in files, each file comprising branches, each branch comprising versions of the file) and fine-grained branch mastership, to thereby prevent conflicting modifications to branches from occurring at geographically distributed replicas. The invention also provides fine-grained mastership of meta-data (e.g., version labels, attributes and hyperlinks) which is associated with files, branches or versions for preventing conflicting modifications to meta-data from occurring at geographically distributed replicas. These features allow for periodic updating of replicas, with no need for manual intervention to resolve conflicting branch or meta-data modifications.

An advantage of the invention is its unobtrusiveness. In most respects, developers in a geographically distributed software development project detect little or no change in their local development environment or global development policies when the invention is utilized. Even for project administrators, the invention imposes few additional administrative tasks, once the initial setup and configuration of replicas have been completed.

In one aspect, the invention features a data processing system and method for controlling files at a local development site within a geographically distributed multisite software development project. The system includes a storage device, a processor, a mastership enforcer and an exchanger. The storage device stores a local replica, which is a repository of data shared by replicas at all development sites including current and historical versions of source objects and derived objects, accounting data and meta-data. The versioned objects are stored in the local replica in a plurality of "ordinary" files. Each file comprises a plurality of branches, and each branch comprises a plurality of versions of the file.

The processor executes instructions, and retrieves versions of the files from and stores versions of the files in the storage device. The mastership enforcer provides the processor with the exclusive capability to modify specific branches associated with target files by adding new versions of the target files as determined by multisite mastership rules. The processor at the local site has exclusive control over specific branches associated with target files, while other processors at remote sites may have exclusive control over other branches of the same target files. It is noted that the local replica (and each remote replica) restricts the capability to modify each branch to a single user at a time at the local (and each remote) development site. In any event, parallel development on branches of the same target files can proceed simultaneously without conflict among the multiple development sites.

The mastership enforcer also provides the processor with the capability to create new branches associated with target files. Any new branches or new versions are stored in the local replica within the storage device. The exchanger periodically updates the local replica by providing new versions of target files to geographically remote development sites and receiving any additional new versions of the files (or branches) created at such remote sites.

In particular, the exchanger utilizes an exporter module, a transporter module and an importer module to accomplish the update or synchronization process. The exporter prepares the new versions of the target files (and any new branches) for exportation to replicas at the geographically remote development sites. The transporter, which is customizable, transports copies of the new versions (and branches) to the remote replicas. The exchanger is flexible in that new versions may be transported over a data communications network or by magnetic tape. The importer imports copies of new versions of the files (and branches) received from the remote replicas.

In accordance with another aspect of the invention, the mastership enforcer provides the processor with the exclusive capability to modify specific types of target meta-data as determined by the multisite mastership rules. Meta-data, also stored in the local replica, is associated with one or more files, branches or versions. The mastership enforcer provides the processor with the capability to modify only types of meta-data (i) designated as being under full control of the local development site, or (ii) designated to be under distributed control and attached to a file, branch or version that is modifiable at the local development site. The exchanger periodically updates the local replica by also exchanging meta-data with remote replicas as described above. Additionally, the mastership enforcer is capable of reassigning the exclusive capability to modify the branches or specific types of meta-data to a remote development site when the exchanger periodically updates the remote replica.

In accordance with another aspect of the invention, the data processing system includes an incremental data recovery method. The system includes a backup storage device for storing a backup copy of the local replica. If the local replica is lost due to a hardware or software failure, the local development site may be recovered by restoring the backup copy of the local replica to the storage device and by importing missing files, branches, versions and meta-data from the remote replicas. In particular, the local development site incrementally imports missing files, branches, versions and meta-data from the remote replicas as part of the periodic updating performed by the exchanger.

BRIEF DESCRIPTION OF THE DRAWINGS

These and other features of the invention are more fully described below in the detailed description and accompanying drawings of which the figures illustrate a data processing system and method for controlling files.

DETAILED DESCRIPTION

Figure 1:
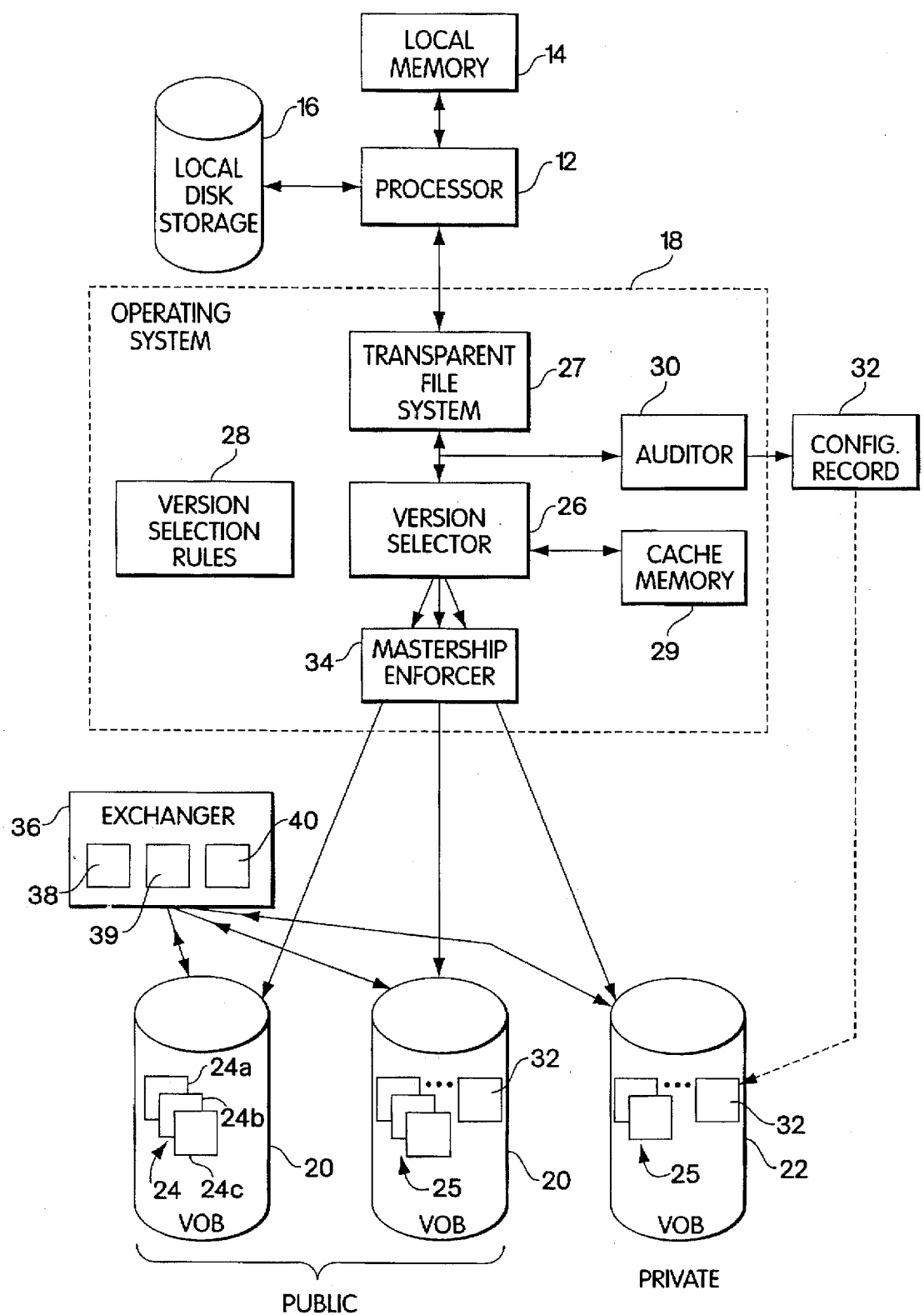
FIG. 1 is a diagram illustrating a data processing system incorporating the principles of the invention.

The present invention features a data processing system and method for controlling files at a local development site within a geographically distributed multisite software development project. A data processing system featuring the invention and supporting a local development site is shown in FIG. 1. As shown, the data processing system 10 includes a processor 12 for executing instructions, a local memory 14, and a local disk storage device 16. The processor uses an operating system 18 to interface to a public storage device 20 and a private storage device 22. Each public and private storage device stores multiple versions of source objects 24 and derived objects 25. Derived objects are typically created by running a system build process on particular versions of source objects. In general, both source and derived objects (files) comprise branches, which further comprise versions.

The operating system includes a version selector 26 for selecting a particular version of objects (files), for example, for use by the processor according to version selection rules 28. The selected version is presented to the processor through a transparent file system interface 27. A cache memory 29 can be provided for storing the identity of selected versions, and can be invalidated upon detecting a change to the versions, the version selection rules, or otherwise, which could affect the selected version. An application or other process running on the processor uses the selected version without any need for further modification or translation of the file.

The operating system also includes an auditor 30 for recording an audit (configuration) record 32 of the versions used by the processor for constructing a particular derived object version. These versions can be selected by the version selector according to the version selection rules, or they can be selected in another manner. The audit record can be associated with particular derived object versions and stored along with those versions for future reference.

The mastership enforcer 34 provides the processor with the exclusive capability to modify specific branches of a file by adding new versions of the files as determined by multisite mastership rules. The processor has exclusive control over specific branches of the file, while other processors at remote sites (not shown) have exclusive control over other branches of the same file. The storage devices restrict the capability to modify each branch to a single user at a time at the local development site. Parallel development on branches of the same target files can proceed simultaneously without conflict among multiple development sites.

The mastership enforcer also provides the processor with the capability to create new branches of target files. Any new branches or new versions are stored in a storage device.

The exchanger 36 periodically updates the storage devices by providing new versions of files to geographically remote development sites (not shown) and receiving any additional new versions of the files (or branches) created at such remote sites. In particular, the exchanger utilizes an exporter module 38, a transporter module 39 and an importer module 40 to accomplish the update (or synchronization) process. The exporter prepares copies of the new versions of the files (and any new branches) for exportation to replicas at the geographically remote development sites. The transporter transports copies of the new versions (and branches) to the remote replicas. The transporter is customizable and can therefore support any network protocols or unusual network configurations. Also, the exchanger is flexible in that new versions may be transported over a data communications network or by magnetic tape. The importer adds to the storage device copies of new versions (and branches) of the files received from the remote replicas.

Figure 2:
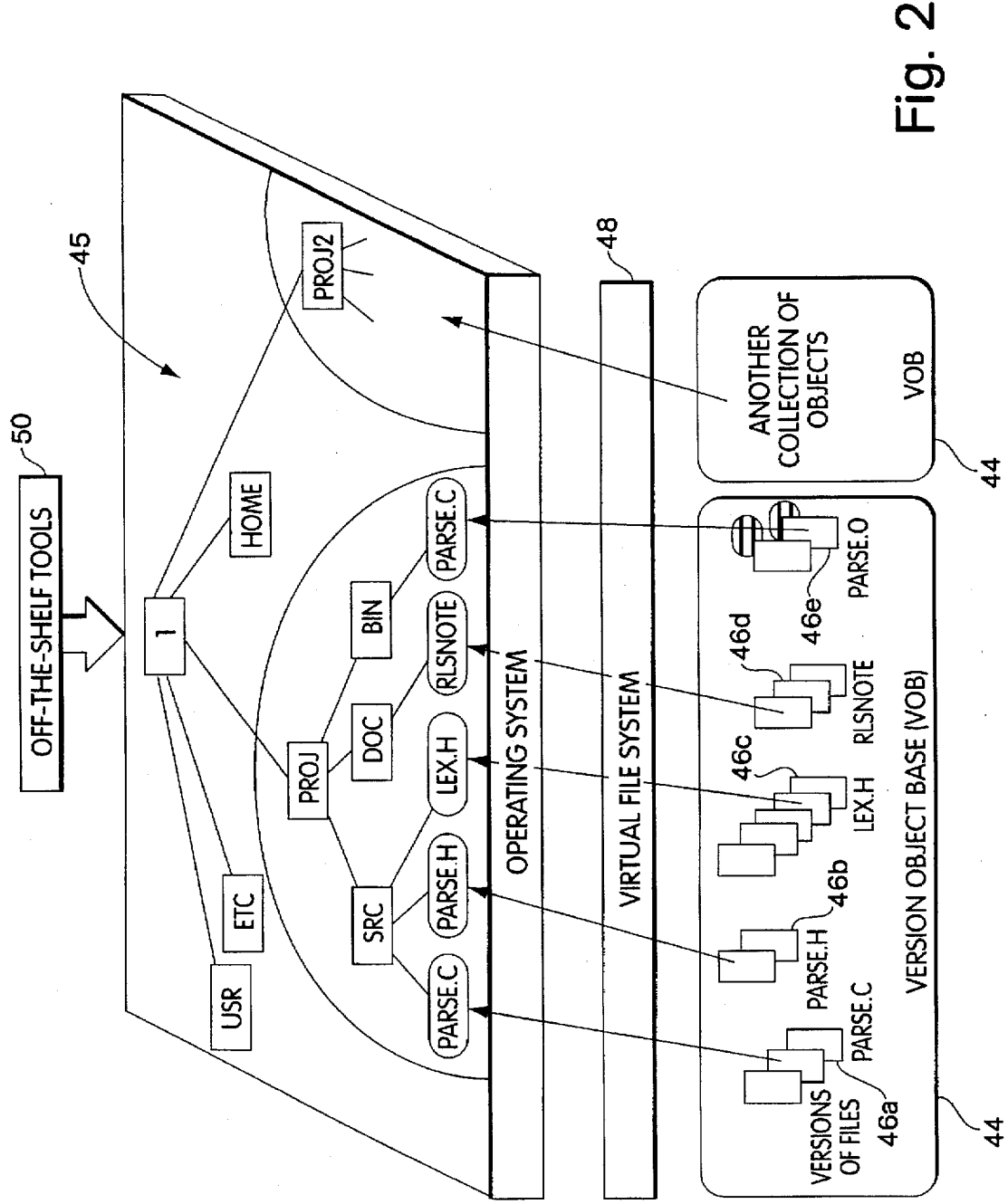
FIG. 2 is a diagram illustrating a transparent file system for viewing selected versions of the files stored in a versioned object base.

FIG. 2 illustrates a transparent file system for viewing selected versions of the files stored in a versioned object base (VOB). A VOB 44 is a permanent, secure data repository. It contains data that is shared by all developers, including current and historical versions of source and derived objects (elements). In addition, the VOB stores detailed "accounting" data on the development process itself (e.g., who created a particular version, what versions of sources went into a particular build, and other relevant information). The VOB also stores user defined meta-data, such as mnemonic version labels, interobject relationships (i.e., hyperlinks), and attributes.

VOBs can be physically located throughout the local area network (and each remote network), and mounted on various workstations and server machines. For instance, in a UNIX environment, hosts can mount any number of VOBs with the standard UNIX mount (1M) command. Further, the data storage for an individual VOB can be distributed across the network, even to hosts that are not running version control software. This scaleable client-server architecture optimizes usage of network resources. Typically, VOBs containing shared data are located on high-speed network server hosts. Software developers and their "views" of the VOBs are located on individual workstations.

VOBs are shared resources, which can be distributed throughout a network. Each VOB acts as a federated database in that it is independent but cooperative with other VOBs, and can be linked into one or more logical trees 45. A development project may include private VOBs and shared VOBs that hold common interfaces or reusable components. The VOB is the unit of data that is replicated in accordance with the principles of the invention.

There are many versions of each file (46a–46e) in each VOB, and there may be many names and directory structures for the files for reflecting reorganizations of the source tree over time. Rather than copying versions into a physical workspace, the data processing system utilizes a virtual file system 48 to create a virtual workspace called a view. A view makes a VOB look like an ordinary file system source tree to software developers and their off-the-shelf tools 50. A set of user-specified rules determines which version of each file and directory is visible through a view.

Figure 3:
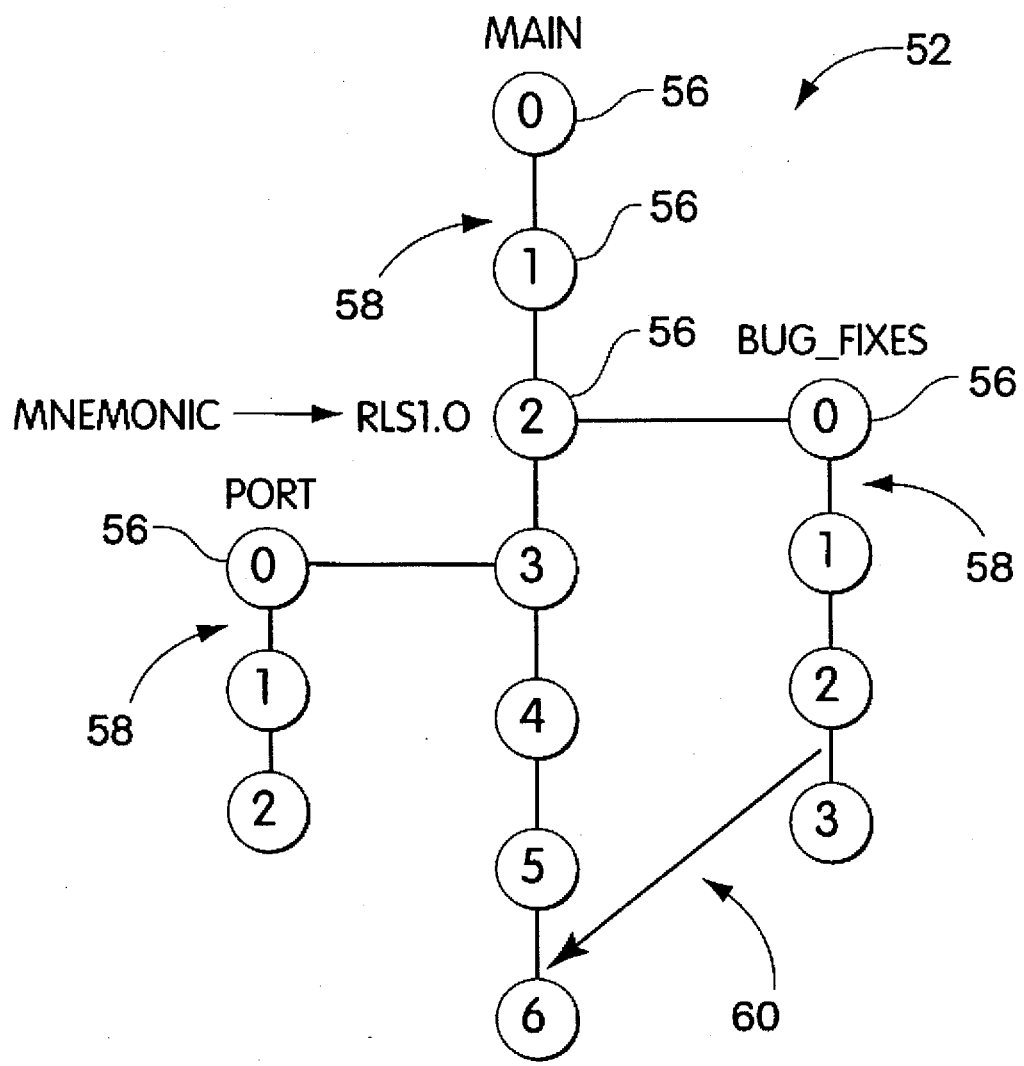
FIG. 3 is a diagram illustrating a file branching structure for storing multiple versions of the files in a local parallel development project.

FIG. 3 is a diagram illustrating a file branching structure for storing multiple versions of the files in a parallel development project at a local site. This parallel development capability is accomplished through branching, which is the maintenance of multiple independent lines of descent in a version tree, each evolving independently. This branching structure allows multiple software developers to modify a single source file 52 simultaneously, without contention or loss of changes.

Each version-controlled file 52 stored in a VOB is referred to as a file element with its versions 56 organized into a version tree structure, having branches (and sub-branches) 58. Branches and versions can be assigned user-defined names for easy access by the user. For example, the primary branch of a version-controlled file is often called "main". Any type of file can be version-controlled, including source code files, requirement documents, design notes, user documentation, binary files, test suites, databases, etc..

The version tree can, for instance, store "old" versions of source files, enabling the rebuilding and maintenance of "old" files or software releases. Each branch or sub-branch 56 can grow independently, so that multiple variants of a versioned file can be developed concurrently. It is easy both to create a branch or sub-branch and to reintegrate the work done on a branch or sub-branch into other lines of development through an automated merger operation 60. This allows users to keep working even when a line of development is frozen or reserved, for example, during a software integration period. In such situations, a user can work on a branch, and then reintegrate the new work into another line of development.

For example, a product may require ongoing bug fixes to one release (RLS1.0), while ongoing development of another release continues in parallel. This scenario is supported by maintaining separate branches for ongoing development (main branch) and for bug fixes (sub-branch). This ensures that bug fixes do not accidentally pick up ongoing development work, which has not yet been fully tested. Each branch can be independently checked out and checked in (i.e., new versions added) by a single user at a time. Eventually, changes made on the different branches are reconciled or merged. The merger operation 60 provides powerful tools for finding branches that need to be merged, for performing the merges and for tracking merges that have been performed, both for reporting purposes and to optimize subsequent merge operations.

As noted above, each VOB stores user defined meta-data, which includes version labels, attributes and hyperlinks. Version labels are mnemonic names for particular versions. For example, foo.c version 21 might be tagged with the label "RLS2" in order to indicate that the version was used in the build of the second release. Attributes are name/value pairs, which can be attached to individual versions, entire branches, or entire file elements. Attributes are often used to represent state information about a version, for purposes of integrating process-control mechanisms with the version control system. For example, an attribute may be attached to a source file version in order to indicate the bugs fixed by that version. Hyperlinks enable users to define structured or ad hoc relationships between pairs of objects. For example, foo.c can point to foo.doc via a "design_for" hyperlink. Hyperlinks are useful for requirements tracking and, with a graphic display of the relationship network, navigating between related objects.

Figure 4:
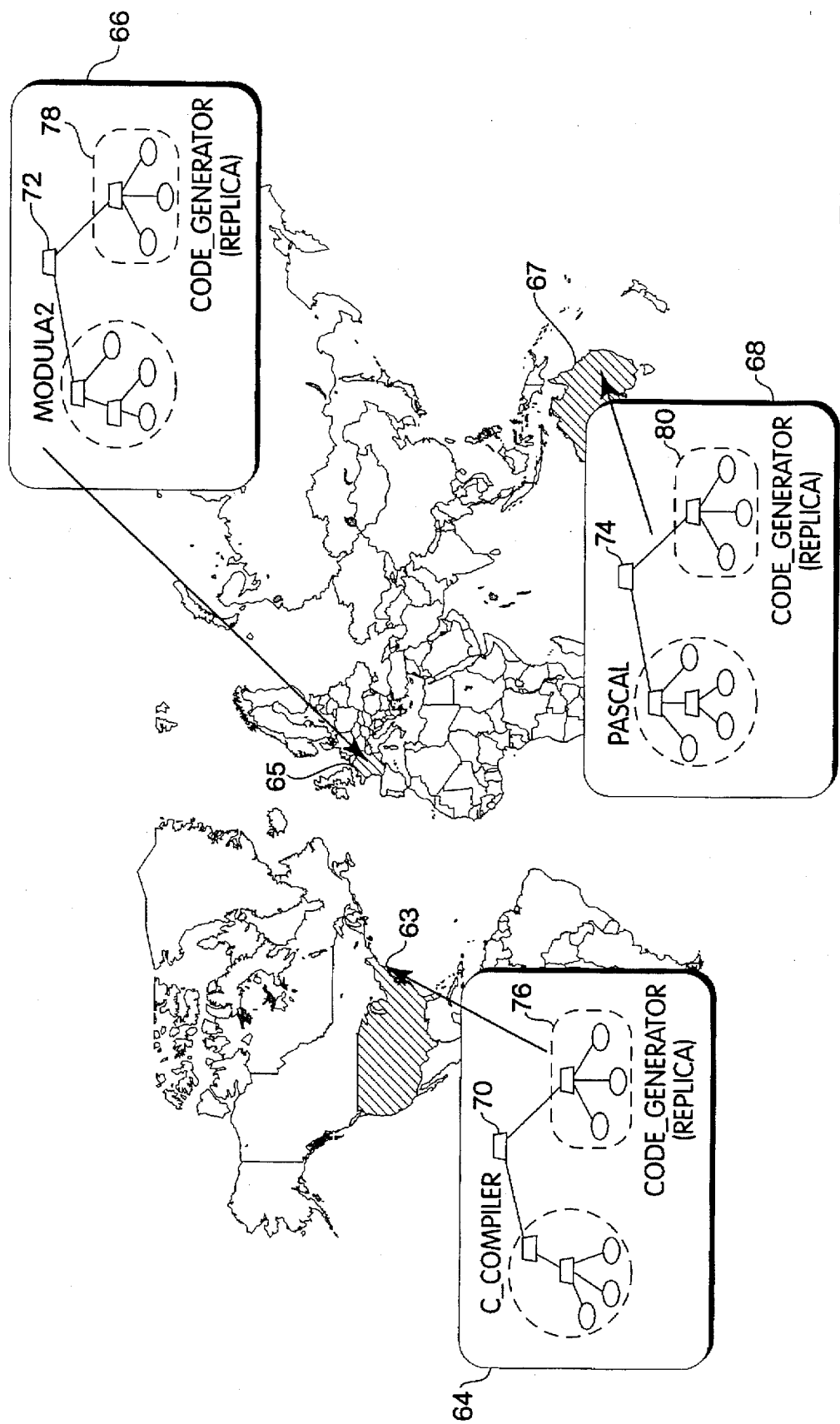
FIG. 4 is an example of a geographically distributed, multisite software development project incorporating the principles of the invention.

FIG. 4 is an example of a geographically distributed, multisite software development project incorporating the principles of the invention. The development project is supported by three development sites: a local site 63 and two remote sites 65 and 67. Each site includes a version control system 64, 66 and 68 for supporting geographically-distributed software development. Collectively, the site-based version control systems provide weakly-consistent VOB replicas and fine-grained branch (and meta-data) mastership, to support parallel development and prevent conflicting modifications to branches (and meta-data) from occurring at the geographically distributed replicas. Further, these systems allow for periodic updating of VOB replicas, with no need for manual intervention to resolve conflicting branch (or meta-data) modifications.

Each version control system supports geographically distributed software development in a manner analogous to parallel development at a single site. That is, parallel development proceeds concurrently and independently using different branches of file's version tree. The major difference between local and multiple site parallel development is that each version control system requires that different sites work on different branches. To accomplish this, each version control system assigns site-based mastership to individual branches. This allows for automated, periodic updating of VOB replicas among the sites, eliminating the need for manual intervention to resolve conflicts.

Figure 5:
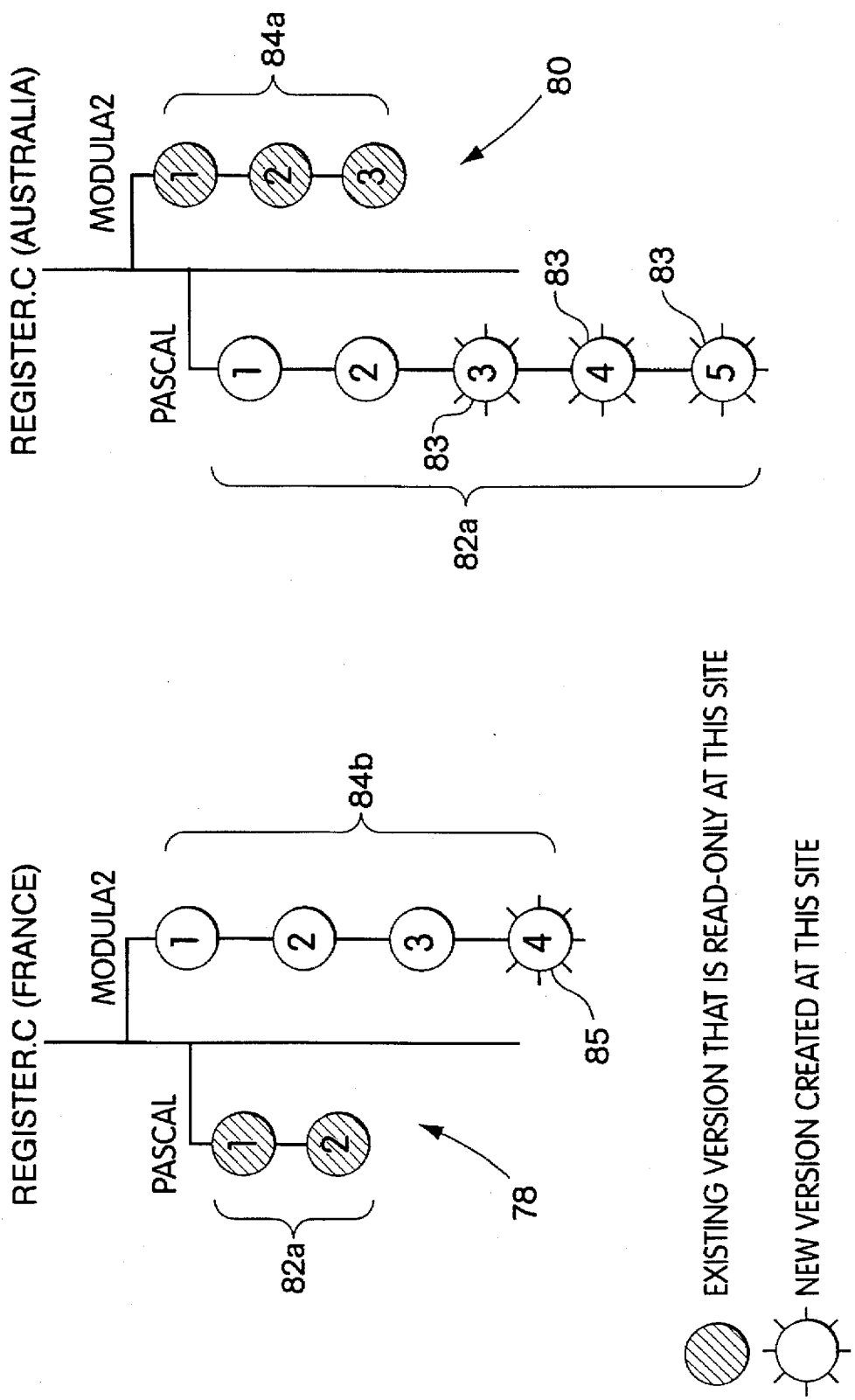
FIG. 5 illustrates the independent site-based development of separate branches of a file branching structure for two geographically distributed replicas based on branch mastership rules.
Figure 6:
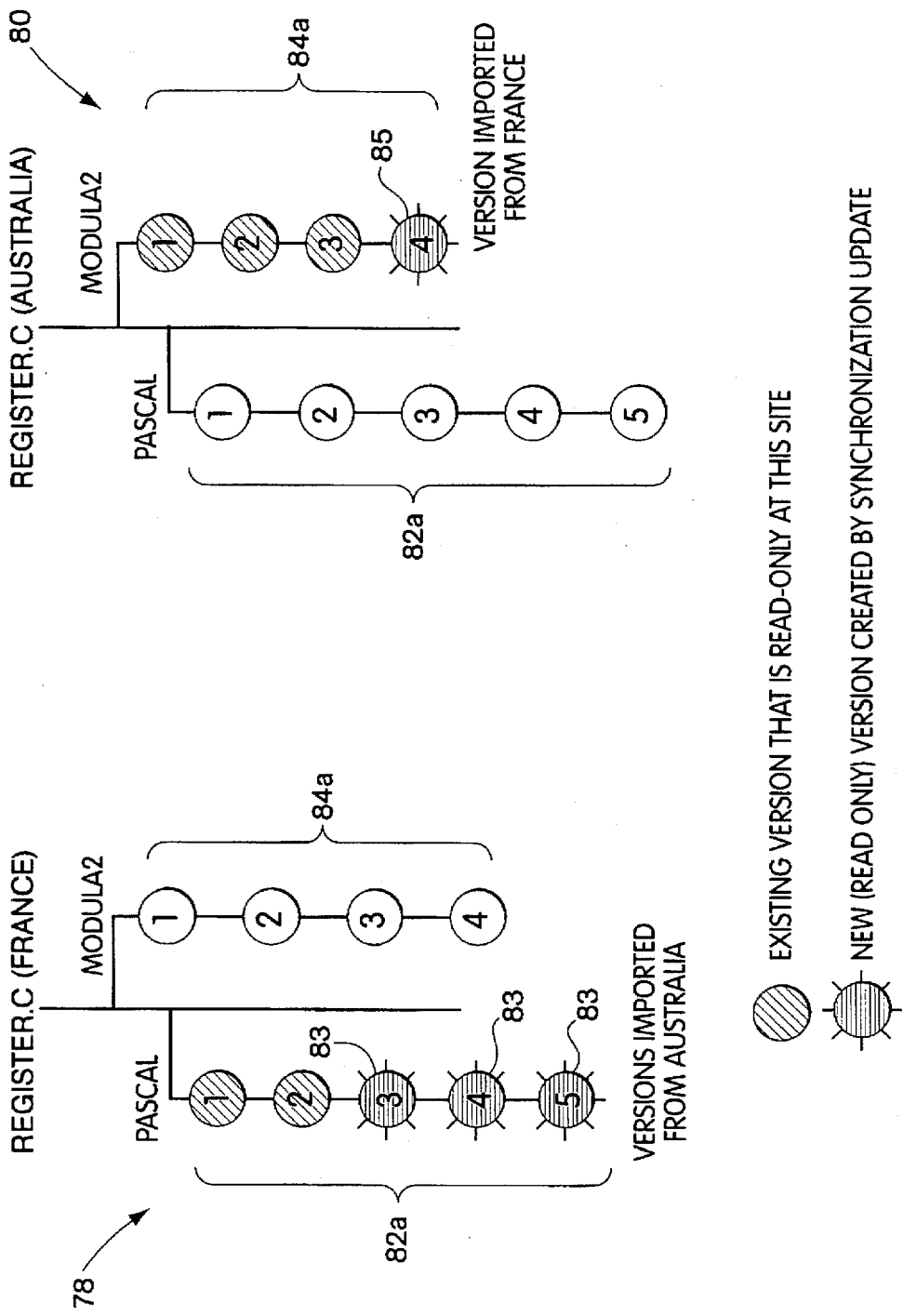
FIG. 6 illustrates an updated file branching structure for two geographically distributed replicas after the independent site-based development of separate branches as shown in FIG. 5.

For example, a geographically distributed software development project has groups developing compilers (70, 72, 74) in different parts of the world (FIG. 4). All the compilers use a common code generator, and all the groups want to share and modify the same code generator source file. Each site has a VOB replica (76, 78, 80) that contains the code generator source file. Referring to FIG. 5, the Pascal group at the Australian site 67 modifies the "pascal" branch 82a in its replica by adding new versions 83. The "modula 2" branch 84a is a read-only branch at the Australian site. The Modula 2 group at the French site 65 modifies the same file on a "modula 2" branch 84b in its replica by adding new versions 85. The "pascal" branch 82b is a read-only branch at the French site. The modifications can occur in parallel without conflicts among the sites. Referring to FIG. 6, each site is periodically updated (or synchronized) with modifications made at other sites automatically.

Each site-based version control system implements the branch development strategy, via a mastership enforcer, which assigns mastership to individual branches and meta-data in accordance with multisite mastership rules. One basic mastership role is that a site can modify only those branches, by creating new versions on the branch, that are mastered by the site's VOB replica. Furthermore, only one site can master each branch at a time. Another rule is that mastership can be transferred between VOB replicas if desirable or necessary. A replica can transfer mastership for all or only some of the branches that it masters. The operation of transferring mastership occurs as part of the periodic updating process between replicas.

Another mastership rule relates only to meta-data. In particular, each piece of meta-data is assigned a type that describes its basic characteristics. Related pieces of meta-data can all be assigned the same type. For example, all labels used to tag the source file versions of a particular release would be given the same type. An "unshared" type gives one replica the exclusive right to modify all meta-data of that type. That is, the meta-data of that type are all given the same mastership. A "shared" type partitions the meta-data of that type, so that each piece of meta-data is mastered by the replica that masters the file, branch or version to which it is attached. New meta-data of that type are automatically assigned the same mastership as the file, branch or version to which they are attached. All replicas can therefore manage and maintain a subset of the meta-data of a shared type without creating conflicting changes and without having to synchronize their changes as they occur. For added flexibility, the type for certain meta-data can be changed from unshared to shared without risking conflicts. Also, the mastership enforcer can reassign the mastership of a type of meta-data from one replica to another when the exchanger periodically updates the replica.

Branch mastership provides the proper level of granularity for geographically distributed, parallel software development. Coarser grained mastership, such as at the file level, precludes geographically distributed, parallel development because users at two sites are precluded from modifying the same file at the same time. Without any level of mastership, periodic updating of replicas among sites becomes impossible without manual conflict resolution or loss of changes.

Each site-based version control system includes an exchanger for periodically exchanging updated version information and meta-data with VOB replicas at other sites. The replicas in each VOB family are weakly consistent. Local development at various replicas (e.g., new versions checked in, files renamed, labels and attributes added, etc.) make their contents diverge, while periodic updating makes their contents converge again. Periodic updates circulate branch and meta-data modifications among the replicas in a VOB family. The replica update topology can be a star, a multi-hop chain, or any graph that enables updates to eventually flow from one replica to all others in the VOB family. The exchanger typically transports updates over a data communications network. For sites weakly or not connected by a network, a file transport mechanism (e.g. one based on electronic mail or magnetic tape) can be used.

The technical details of the updating process implemented in an exchanger of the version control system of the invention are provided hereinafter. An exchanger 36 (FIG. 1) updates a VOB replica using a mechanism somewhat analagons similar to the multiple-part timestamp schemes. As changes are made to the replica, a record of each change is stored as an entry in an operations log in the replica. The exchanger exports changes made to the replica to remote replicas by generating a synchronization packet. This packet (file) contains all of the operations log entries made in the replica since the last generated synchronization packet. This includes changes that originated at the replica, as well as changes received from remote replicas. The data is stored in external data representation (XDR) format so it can be processed by any target architecture. At each remote replica, a remote exchanger imports the changes contained in the packet by replaying them in order. Any such changes previously imported from another replica by the remote replica are ignored.

The exchanger ensures that operations are imported and performed in a consistent order. The dependencies between operations originating at the same and/or at different replicas form a partial order that reflects the potential flow of information between the operations. Any operation performed on the local replica may depend on any preceding operation performed on that replica, including both operations that originated at the replica as well as operations imported from remote replicas. The exchanger is designed to ensure that no operation is imported into the local replica before any of the operations on which it potentially depends (i.e. the exchanger guarantees that the state of each replica reflects a consistent cut in the dependency graph of operations).

Figure 7:
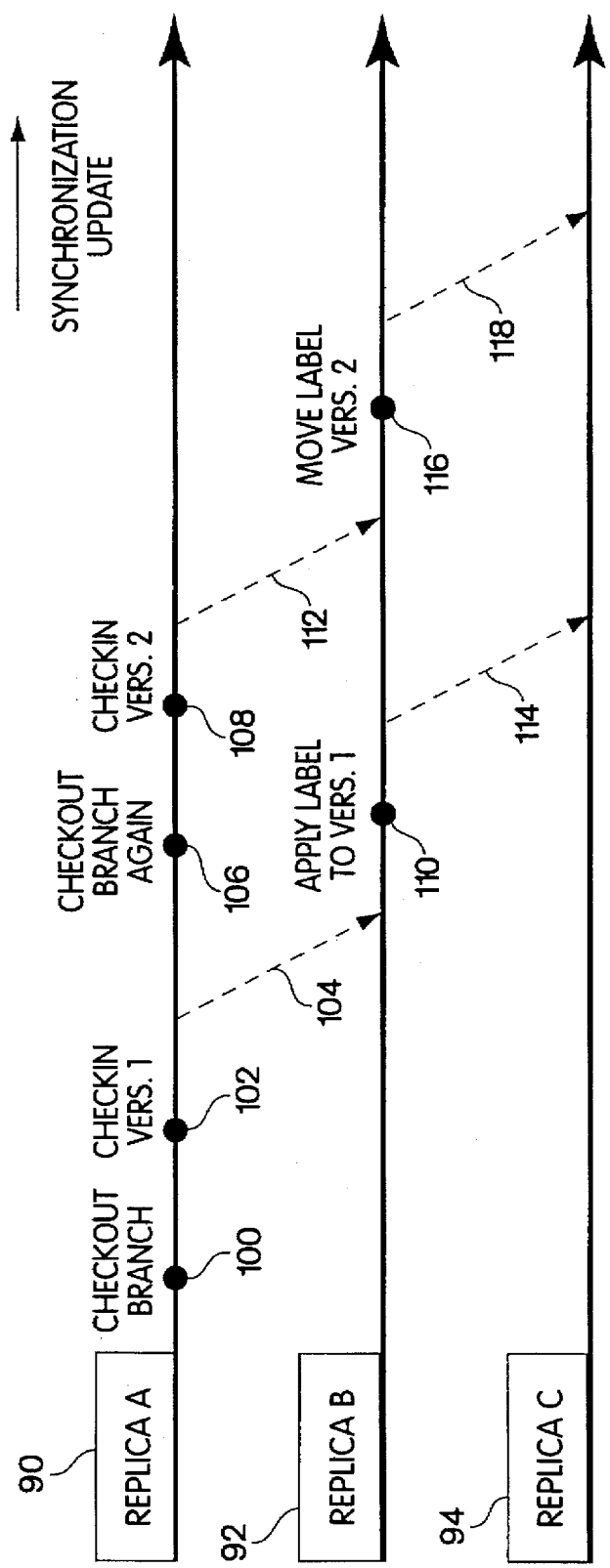
FIG. 7 is a diagram illustrating the updating process utilized by geographically distributed replicas to exchange modifications incurred during site-based development.

FIG. 7 is a diagram illustrating the updating process utilized by geographically distributed replicas (90, 92, 94) to exchange modifications incurred during site-based development. More specifically, the exchanger (not shown) for each version control system performs the updating process to synchronize its site's replica with remote replicas.

To create a symbolic label (e.g. "Beta-Release") on version 1 of a file at replica B, it is required that a copy of version 1 has migrated to replica B. Thus, the label creation operation 110 depends on the first checkout/checkin operation pair (100, 102) made by replica A 90. These operations are subsequently imported by replica B (92), creating version 1 at replica B (104). The label creation operation 110 can then be performed.

The label moving operation 116 at replica B moves the symbolic label from version 1 of the file to version 2. It depends upon the earlier label application (110) at that replica, the second checkout/checkin pair of operations (106, 108) made at replica A, and the creation of version 2 (112) at replica B. The exchangers guarantee that these operations are imported in an order consistent with their dependencies. For example, an exchanger might import both checkout/checkin pairs before either labeling operation, or as shown, each labeling operation might immediately be imported after the corresponding checkout/checkin pair. Either order of operations is consistent with the operations' dependencies. However, no exchanger imports either of the labeling operations without having previously imported the corresponding checkout/checkin pair. Further, no exchanger imports the label movement without previously having imported the original label application.

Each replica records in its operation log every operation performed on that replica, including both operations that originated at the replica as well as operations imported from remote replicas. The operation log for a replica is maintained as part of the replica itself, and operations are logged immediately as part of the transaction of the operation. As a result, the log always reflects exactly the set of operations performed on the replica, and the order in which the operations were performed.

To track the potential dependencies between operations, each operation logged in a particular replica is tagged with both the identity of the replica at which the operation originated, and a virtual timestamp reflecting the order of the operation with respect to others that originated at the same replica. The virtual timestamp is implemented as a counter of the number of operations that originated at the replica, and is termed an "epoch number".

Figure 8:
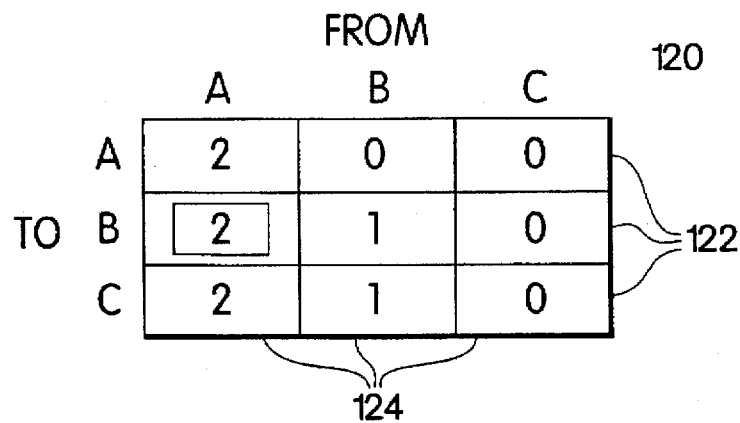
FIG. 8 is a table illustrating virtual timestamps for one of the replicas shown in FIG. 7.

Each replica also attempts to track the state of each remote replica, using a table of virtual timestamps maintained in the replica. FIG. 8 is the table 120 maintained for replica B 92 (FIG. 7) and illustrating virtual timestamps of each replica in the VOB family. The table contains one row 122 and one column 124 for each replica. The virtual timestamp in row i of column b of the table reflects the last known operation originating from replica b that was imported by replica i. Each row of the table therefore represents a multi-part timestamp (i.e. a cut in the operations dependency graph) reflecting the last known state of the corresponding replica. This is not necessarily the actual current state of that replica, but a conservative estimate of it. The table also contains a row for replica B. This row represents the highest numbered operations performed or imported at that replica, and is always kept up-to-date with the actual state of the replica (i.e. it always reflects replica B's actual state).

With reference to FIG. 7, FIG. 8 shows the state of replica B's table immediately after the first update generated to replica C (114). Note that replica B is not aware of the second pair of checkout/checkin operations (106, 108) being performed concurrently at replica A. It is only aware of the operations sent to it by replica A in the earlier update (100, 102), as well as its own operations (i.e. Row B, Column A says "2").

In order to generate an update from a particular replica to other remote replicas, the exchanger scans the log of the sending replica looking for operations that are not known to have already been imported by the destination replica. It does this by scanning for entries with timestamps (epoch numbers) higher than those reflected in the table row for the destination replica. A record of each such operation found is XDR encoded and recorded in the update packet, along with the identity of the replica at which the operation originated and the operation's virtual timestamp. Operations are recorded in the packet in the same order in which they occur in the log. Because each remote replica's row in the table reflects a conservative estimate of its actual state, the update packet may contain operations already performed or imported by the destination replica. These are discarded later by the each remote replica when importing the packet.

Returning to the example set forth in FIGS. 7–8, the second update (118) generated from replica B to replica C contains the second checkout/checkin pair of operations (106, 108) followed by the label movement operation 116. As shown in FIG. 8, these are the only operations in the log of replica B with virtual timestamps larger than the corresponding entries in its table row for replica C.

The exchanger takes an optimistic approach to maintaining virtual timestamp tables. Immediately after generating an update packet, the exchanger associated with the local replica increments the entries in the table row for the remote (destination) replica in order to reflect the operations sent in the packet. No acknowledgment of receipt is required from the remote replica. The next update generated from the local replica begins where the last update left off, without duplicating any of the operations contained in the previous update. Although this is optimal during normal operation, it requires special actions to detect and handle lost updates when they occur (as discussed in more detail below).

Each update packet contains the virtual timestamp table row for the remote replica that was used to determine which operations to include in the packet. This row represents the starting state of the packet (i.e. the set of operations already expected to be possessed by the remote replica before it imports the operations contained in the update packet). This row is also useful for determining the order in which the remote replica should process update packets. Each update packet also contains the local replica's virtual timestamp table from its own table. This allows the remote replica to track the actual state of the local replica without substantial overhead.

Before allowing the local replica to import from a remote replica the operations contained in an update packet, the (local) exchanger first checks to determine if doing so would create an inconsistency in the remote replica. That is, the exchanger compares the "starting state" virtual timestamp row contained in the packet to the local replica's own table row for itself. If any entry in the packet row is larger than the corresponding entry in the local replica's table row, then the local replica is missing operations that the remote replica expected the receiver to have already imported. These may be operations contained in other packets that have not yet been imported, or they may be operations contained in a packet that was lost before being imported. In either case, importing the packet could create an inconsistency, and its processing is deferred by the exchanger until the missing operations are imported.

Because successive packets from the remote replica use successively larger "starting state" virtual timestamp rows (i.e. the rows will contain larger entries on a component-by-component basis), the local replica can determine the order in which the packets were created by the remote replica and the order in which they should be processed.

Thus, referring to the previous example, if the first update from replica B to replica C were lost, then this situation would be detected by replica C when it attempted to import the second update from replica B. The "starting state" timestamp row in the second packet would be the last row from the table of FIG. 8, and would indicate that replica C was expected to have already imported the first two operations originated from replica A, and the first operation originated from replica B.

If the exchanger associated with the local replica has already performed or imported all of the operations identified by the "starting state" row in the packet, then the operations contained in the packet are also imported into the local replica. All operations are imported in the order in which they appear in the packet, and the local replica's own table row is updated to reflect each operation as it is imported. If the packet contains an operation previously imported into the local replica from some other packet (i.e. an operation with a virtual timestamp smaller than the appropriate component of the importing replica's table row), then the operation is ignored. If the exchanger associated with the local system fails part way through the importation of a packet, then it is safe to restart the importation from the beginning once the local site has recovered.

To prevent operation logs from growing without bound, entries must eventually be purged from the logs. The exchanger uses an age-based mechanism to decide when an entry should be removed from a log. By default, an entry is deleted after it has been in a log for 180 days (this value can be configured by the site administrator to reflect their update pattern and rate). No check is performed to determine if the entry might still need to be sent to a remote replica.

The exchanger detects when needed entries have been purged from a log, and prevents potentially inconsistent updates from being made. Because successive operations originating at a replica are assigned virtual timestamps that differ by one, the exchanger can detect operation gaps between the last known state of a replica, and the actual operations written to an update packet for that replica. The exchanger verifies that the operations written to an update packet have virtual timestamps beginning with values exactly one larger than the timestamps in the table row for the remote (destination) replica. If this is not the case, then the remote replica must import the missing changes from some other replica or the replica must be recreated from a more up-to-date replica.

The data processing system of the invention also includes a backup recovery mechanism that combines local backup restoration for retrieving the bulk of data lost in a failure with incremental restoration from the remote replicas. When a replica is destroyed, it is initially restored from a copy of the replica stored in a local backup storage device. Any changes logged by remote replicas, but not restored by the local backup, are then sent from the remote replica that logged them and replayed at the failed replica. The incremental changes are sent as part of the periodic updating process between replicas. As a result, the incremental restoration phase is handled completely automatically and no special communication between the replicas is required to perform incremental restoration. The remote replicas therefore act as incremental backups of the failed replica. This mechanism restores the maximum number of changes to a failed replica, while minimizing the amount of data that needs to be retrieved from remote replicas.

When a replica is restored from a backup storage device, it is not possible to immediately permit users to access the restored replica without risking the consistency of the VOB family. Remote replicas in the VOB family may have imported operations that originated at the restored replica before its failure, but that were made after the backup (and not therefore recovered from the backup copy). Any new operations originated at the restored replica risk reusing the same virtual timestamps as those used by other operations already imported by remote replicas, thereby defeating the updating process. The incremental changes must therefore be restored to prevent such occurrences.

Figure 9:
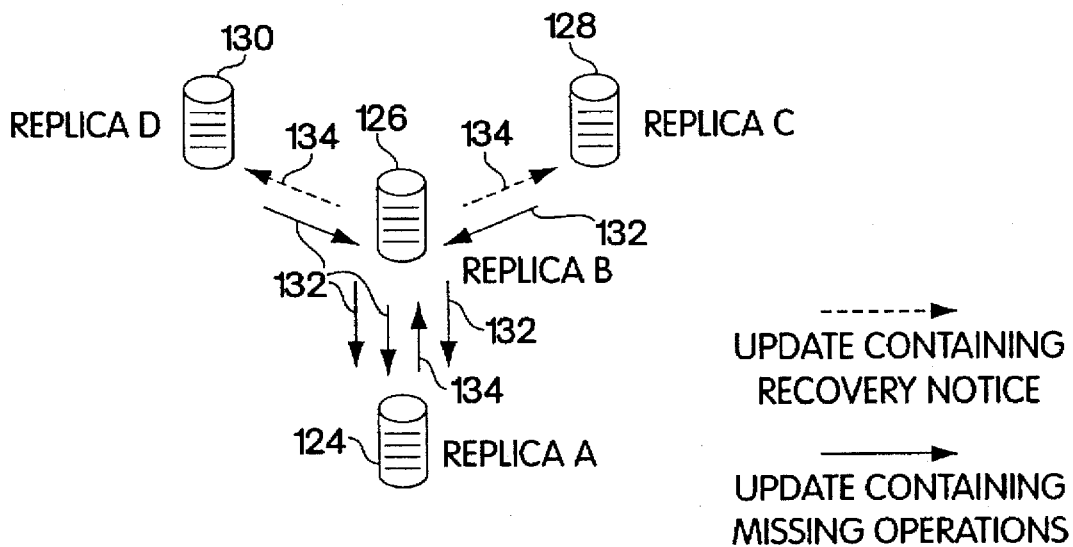
FIG. 9 is an example of the recovery process implemented by geographically distributed replicas when a site loses its replica.

FIG. 9 is an example of an incremental recovery process implemented by each exchanger in geographically distributed data processing systems when one site loses its replica to a hardware or software failure and the backup copy has been restored via the backup device. The recovery process requires the restored replica A (124) to re-import any operations (132) it originated and that are possessed by remote replicas B, C, D (126, 128, 130) before permitting users to perform new operations on the restored replica. The recovery process piggybacks on the normal updating process performed by each exchanger.

The basic idea behind the recovery process is to cause remote replicas to reset their virtual timestamp table row for the restored replica to reflect the restored state of that replica. Subsequent updates generated from the remote replicas then carry any missing operations (i.e., any operations with higher virtual timestamps) to the restored replica. Once all of these operations are imported by the restored replica, new operations can safely be performed without reusing any virtual timestamps already possessed by VOB family members.

When a replica is restored from a backup device, it is immediately locked to prevent users from making any new changes that would generate operations log entries. A special entry is added to the operations log to indicate that the replica was restored from backup, and the restored replica's virtual timestamp table row is added to that entry to indicate its restored state. The entry is assigned a special virtual timestamp (the highest possible timestamp) and treated specially by the exchanger during the updating process. The special entry cannot be assigned a normal virtual timestamp because any such timestamp may conflict with one previously used by the replica before the failure. The normal process of updating and importing packets then resumes, although the importing of most packets will be deferred by the restored replica due to the "starting state" check.

When the remote replicas import the special operations log entry, they reset their virtual timestamp table row for the restored replica to the value indicated by the entry. Each importing replica also adds the special entry to its operations log so that it can be propagated to other remote replicas which may not be being directly updated by the restored replica. Each importing replica also adds a special acknowledgment entry to its operations log to indicate that it has seen the entry from the restored replica. When the restored replica imports an acknowledgment entry from every remote replica, the restored replica is unlocked and new operations are permitted to be performed.

A real timestamp (clock time) is also added to the special log entry created by the restored replica to handle the situation where the restored replica is re-restored from a backup device before completing its recovery. It is only necessary for the remote replicas to acknowledge the latest recovery phase of the restored replica. The remote replicas therefore only reset their virtual timestamp tables in response to a special log entry with a real timestamp later than any previously seen.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

We claim:

1. A data processing system for controlling files at a local development site within a geographically distributed multisite software development project including remote development sites, comprising:

a storage device for storing a local replica comprising a plurality of files, each file comprising a plurality of branches, each branch comprising a plurality of versions of each file, a processor for executing instructions and retrieving versions from and storing versions to the storage device, a mastership enforcer for (i) providing the processor with the exclusive capability to modify specific branches by adding new versions of target files and (ii) preventing the processor from modifying other branches, as determined by multisite mastership rules, and an exchanger which periodically updates the local replica by exporting the new versions of the target files to remote replicas at remote development sites and importing additional new versions of the files from remote replicas.

2. The data processing system of claim 1 wherein the local replica further comprises meta-data which is associated with one or more files, branches or versions, wherein the mastership enforcer provides the processor with the exclusive capability to modify specific types of target meta-data as determined by multisite mastership rules, wherein the exchanger periodically updates the local replica by exporting the modified target meta-data to the remote replicas and importing additional modified meta-data from the remote replicas.

3. The data processing system of claim 2 wherein the mastership enforcer provides the processor with the capability to modify only (i) types of meta-data designated as being under full control of the local development site or (ii) types of meta-data designated to be under distributed control and attached to a file, branch or version that is modifiable at the local development site.

4. The data processing system of claim 2 wherein the mastership enforcer is capable of reassigning the exclusive capability to modify the specific types of target meta-data to a remote development site.

5. The data processing system of claim 2 wherein the mastership enforcer is capable of reassigning the exclusive capability to modify the branches or specific types of meta-data to a remote development site when the exchanger periodically updates the local replica.

6. The data processing system of claim 2 wherein the exchanger further comprises an exporter for exporting the new versions of the target files and meta-data to each remote replica, a transporter for transporting the new versions of the target files and meta-data to the remote replicas and an importer for importing additional new versions of the files and meta-data from the remote replicas.

7. The data processing system of claim 6 wherein the new versions of the target files and meta-data are transported over a data communications network or by magnetic tape.

8. The data processing system of claim 6 wherein the transporter is customizable.

9. The data processing system of claim 2 further comprising a backup storage device for storing a backup copy of the local replica, wherein the local development site is restorable after loss of the local replica by restoring the backup copy of the local replica to the storage device and by importing missing files, branches, versions and meta-data from the remote replicas.

10. The data processing system of claim 9 wherein the local development site, after having restored the backup copy of the local replica, imports missing files, branches, versions and meta-data from the remote replicas as part of the periodic updating performed by the exchanger.

11. The data processing system of claim 1 wherein the mastership enforcer is capable of reassigning the exclusive capability to modify the branches to a remote development site.

12. The data processing system of claim 1 wherein the local replica further restricts the capability to modify each branch to a single user at a time at the local development site.

13. A method for controlling versions of the files at a local development site within a geographically distributed multi-site software development project which includes remote development sites, comprising:

storing a local replica comprising a plurality of files in a storage device, each file comprising a plurality of branches, each branch comprising a plurality of versions of the file, executing instructions and retrieving versions from and storing versions to the storage device using a processor, providing the processor with the exclusive capability to modify specific branches by adding new versions of target files and preventing the processor form modifying other branches, as determined by multisite mastership rules, and periodically updating the local replica by exporting the new versions of the target files to remote replicas at remote development sites and importing new versions of the files from remote replicas.

14. The method of claim 13, wherein the local replica further comprises meta-data which is associated with one or more files, branches or versions, further providing the processor with the exclusive capability to modify specific types of target meta-data as determined by multisite mastership rules, wherein the exchanger periodically updates the local replica by exporting the modified target meta-data to the remote replicas and importing additional modified meta-data from the remote replicas.

15. The method of claim 14 further comprising reassigning the exclusive capability to modify the specific types of target meta-data to a remote development site.

16. The method of claim 14 further providing the processor with the capability to modify only (i) types of meta-data designated as being under full control of the local development site or (ii) types of meta-data designated to be under distributed control and attached to a file, branch or version that is modifiable at the local development site.

17. The method of claim 14 further comprising periodically updating the local replica by exporting the new versions of the target files and modified target meta-data to each remote replica, transporting the new version of the target files and modified meta-data to the remote replicas, and importing additional new versions of the files and meta-data from the remote replicas.

18. The method of claim 17 wherein the transporting is customizable.

19. The method of claim 17 further comprising transporting the new versions of the target files over a data communications network or by magnetic tape.

20. The method of claim 14 further comprising reassigning the exclusive capability to modify the branches or specific types of meta-data to a remote development site when the exchanger periodically updates the local replica.

21. The method of claim 20 wherein the local development site, after having restored the backup copy of the local replica, imports missing files, branches, versions and meta-data from the remote replicas as part of the periodic updating performed by the exchanger.

22. The method of claim 14 further comprising storing a backup copy of the local replica in a backup storage device, wherein the local development site is restorable after loss of the local replica by restoring the backup copy of the local replica to the storage device and by importing missing files, branches, versions and meta-data from the remote replicas.

23. The method of claim 13 further comprising restricting the capability to modify each branch to a single user at a time at the local development site.

24. The method of claim 13 further comprising reassigning the exclusive capability to modify the branches to a remote development site.

* * * * *